United States Patent
Agron et al.

(10) Patent No.: US 9,110,723 B2
(45) Date of Patent: Aug. 18, 2015

(54) MULTI-CORE BINARY TRANSLATION TASK PROCESSING

(71) Applicant: INTEL CORPORATION, Santa Clara, CA (US)

(72) Inventors: Jason M. Agron, San Jose, CA (US); Koichi Yamada, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 246 days.

(21) Appl. No.: 13/997,630

(22) PCT Filed: Mar. 13, 2013

(86) PCT No.: PCT/US2013/031005
§ 371 (c)(1),
(2) Date: Jun. 24, 2013

(87) PCT Pub. No.: WO2014/142847
PCT Pub. Date: Sep. 18, 2014

(65) Prior Publication Data
US 2014/0282587 A1 Sep. 18, 2014

(51) Int. Cl.
*G06F 9/46* (2006.01)
*G06F 9/50* (2006.01)
*G06F 1/32* (2006.01)

(52) U.S. Cl.
CPC ............ *G06F 9/5027* (2013.01); *G06F 1/3203* (2013.01); *G06F 9/5094* (2013.01)

(58) Field of Classification Search
CPC .... G06F 9/5094; G06F 9/5027; G06F 1/3203
See application file for complete search history.

(56) References Cited

U.S. PATENT DOCUMENTS

| | | | |
|---|---|---|---|
| 7,703,088 B2 * | 4/2010 | Li et al. ........................ | 717/159 |
| 7,765,543 B1 * | 7/2010 | Weissman et al. ................ | 718/1 |
| 7,853,960 B1 * | 12/2010 | Agesen et al. ................ | 719/324 |
| 7,941,791 B2 | 5/2011 | Wang et al. | |
| 8,321,840 B2 | 11/2012 | Nagarajan et al. | |
| 8,352,944 B2 * | 1/2013 | Weissman et al. ............ | 718/100 |
| 8,533,745 B2 * | 9/2013 | Agesen et al. ................ | 719/324 |
| 8,615,647 B2 * | 12/2013 | Hum et al. .................... | 713/100 |
| 8,930,722 B2 * | 1/2015 | Sprangle et al. .............. | 713/300 |

(Continued)

OTHER PUBLICATIONS

International Search Report & Written Opinion mailed Nov. 26, 2014 for International Application No. PCT/US2013/031005, 9 pages.
"Performance Best Practices for VMware vSphere™ 5.0", 2007-2011, 76 pages, Palo Alto, CA.
Hewlett-Packard Corporation, Intel Corporation, Microsoft Coporation, Phoenix Technologies Ltd., and Toshiba Corporation, "Advanced Configuration and Power Interface Specification", Dec. 6, 2011, 958 pages, version 5.0.

(Continued)

*Primary Examiner* — Van Nguyen
(74) *Attorney, Agent, or Firm* — Schwabe, Williamson & Wyatt, P.C.

(57) ABSTRACT

Embodiments of techniques and systems associated with binary translation (BT) in computing systems are disclosed. In some embodiments, a BT task to be processed may be identified. The BT task may be associated with a set of code and may be identified during execution of the set of code on a first processing core of the computing device. The BT task may be queued in a queue accessible to a second processing core of the computing device, the second processing core being different from the first processing core. In response to a determination that the second processing core is in an idle state or has received an instruction through an operating system to enter an idle state, at least some of the BT task may be processed using the second processing core. Other embodiments may be described and/or claimed.

23 Claims, 9 Drawing Sheets

(56) References Cited

U.S. PATENT DOCUMENTS

| | | |
|---|---|---|
| 2007/0006178 A1* | 1/2007 | Tan .............................. 717/136 |
| 2007/0016895 A1* | 1/2007 | Tan .............................. 717/136 |
| 2008/0244538 A1 | 10/2008 | Nair et al. |
| 2008/0288940 A1 | 11/2008 | Adams et al. |
| 2009/0150890 A1* | 6/2009 | Yourst .......................... 718/102 |

OTHER PUBLICATIONS

Dehnert et al., "The Transmeta Code Morphing™ Software: Using Speculation, Recovery, and Adaptive Retranslation to Address Real-Life Challenges", 2003, 10 pages, Santa Clara, CA.

* cited by examiner

| TIME | CORE 0 | CORE 0 EVENTS | CORE 1 | CORE 1 EVENTS | BT QUEUE SIZE |
|---|---|---|---|---|---|
| 0 | Running | | Running | | 0 |
| 1 | Running | | Running | | 0 |
| 2 | Running | | Running | | 0 |
| 3 | Running | Task Identified | Running | | 1 |
| 4 | Running | | Running | Task Identified | 2 |
| 5 | Running | | Idle Detected | | 2 |
| 6 | Running | | Remove Task | ↓ | 1 |
| 7 | Running | | Process Task | | 1 |
| 8 | Running | | Complete | | 1 |
| 9 | Running | | Remove Task | ↓ | 0 |
| 10 | Running | | Process Task | | 0 |
| 11 | Running | | Complete | | 0 |
| 12 | Running | | Return from Idle | Interrupt or Monitor Hit | 0 |
| 13 | Running | | Running | | 0 |
| 14 | Running | | Running | | 0 |
| 15 | Running | | Running | | 0 |

FIG. 4

MULTI-CORE BINARY TRANSLATION TASK PROCESSING

CROSS REFERENCE TO RELATED APPLICATIONS

The present application is a national phase entry under 35 U.S.C. §371 of International Application No. PCT/US2013/031005, filed Mar. 13, 2013, entitled "MULTI-CORE BINARY TRANSLATION TASK PROCESSING", which designated, among the various States, the United States of America. The Specification of the PCT/US2013/031005 Application is hereby incorporated by reference.

TECHNICAL FIELD

The present disclosure relates generally to the field of computing systems, and more particularly, to binary translation in computing systems.

BACKGROUND

Binary translation (BT), the process of analyzing a set of code and translating it into another set of code, may be performed in a number of applications. For example, a set of code may be run through a binary translator programmed with a set of performance goals (e.g., improved speed) to translate the set of code into an optimized set that better achieves the performance goals. Some binary translators will translate code of a piece of software while that software is running by intermittently pausing the software to analyze and translate a code segment. This kind of pause-and-resume operation introduces latency into the execution of the code, and manifests itself to the user as noticeable and seemingly random delays. Additionally, BT tasks require power; even when these tasks are processed when the computing device is otherwise not busy, running a binary translator requires keeping a processor operating when that processor might otherwise be idle.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 4 illustrates an example timeline of multi-core BT task processing operations, in accordance with various embodiments.

DETAILED DESCRIPTION

Embodiments of techniques and systems associated with binary translation (BT) in computing systems are disclosed. In some embodiments, a BT task to be processed may be identified. The BT task may be associated with a set of code, and may be identified during execution of the set of code on a first processing core of the computing device. The BT task may be queued in a queue accessible to a second processing core of the computing device, the second processing core being different from the first processing core. In response to a determination that the second processing core is in an idle state or has received an instruction through an operating system to enter an idle state, at least some of the BT task may be processed using the second processing core.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the term "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
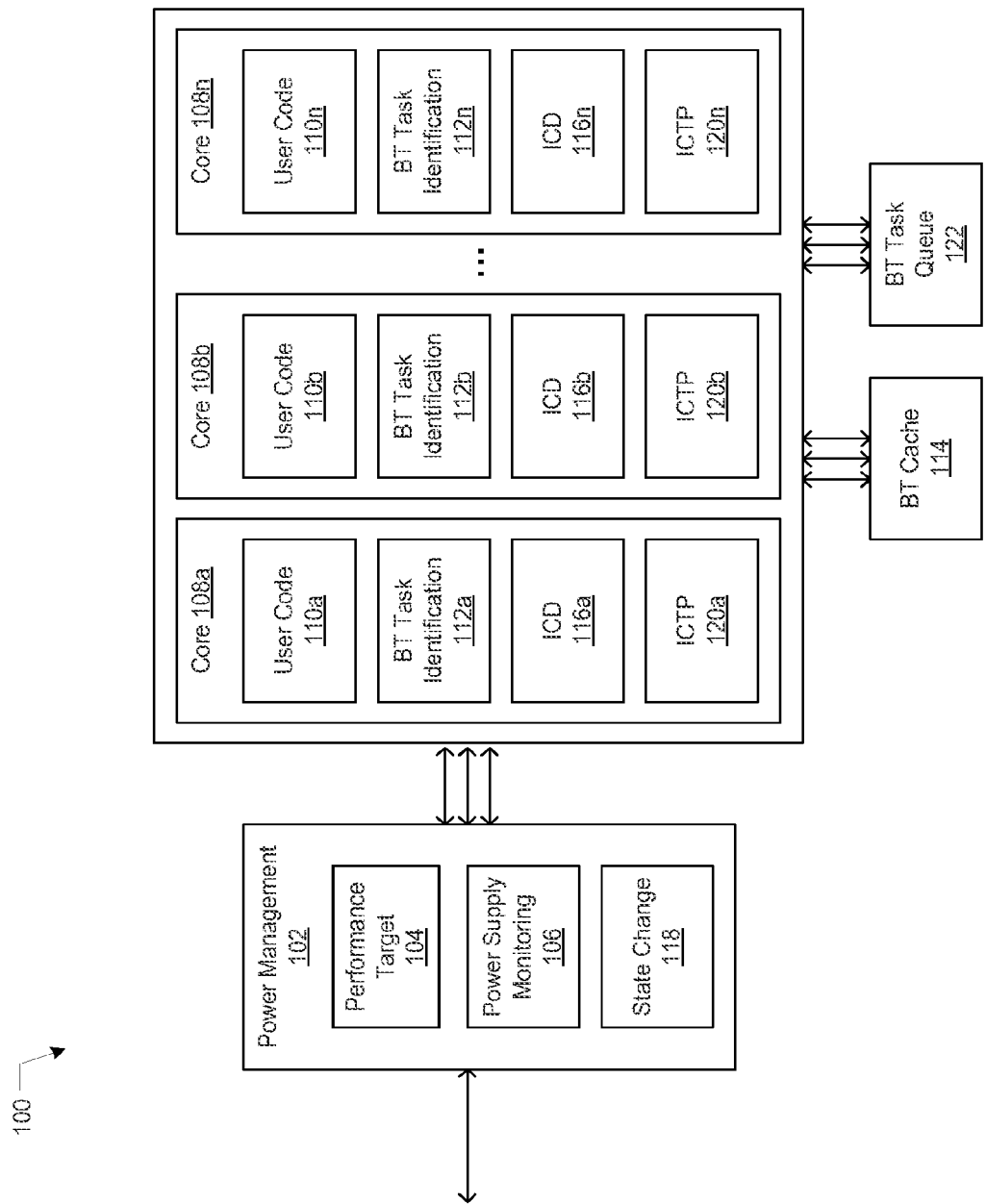
FIGS. 1-3 are block diagrams of components of a multi-core computing device configured for multi-core BT task processing, in accordance with various embodiments.

Referring now to FIG. 1, a block diagram is illustrated of components of computing device 100 configured for multi-core BT task processing in accordance with various embodiments. As shown, computing device 100 may include multiple processing cores 108a-108n Processing cores 108a-108n may include any number of processors known in the art having multiple processing cores, such as one or more dual-core processors. Processing cores 108a-108n may include one or more integrated circuits (ICs), such as one or more semiconductor IC chips. Processing cores 108a-108n may include any combination of general-purpose processing cores and dedicated processing cores (e.g., normal cores, small cores, graphics processing cores, application processing cores, etc.).

As shown in FIG. 1, processing cores 108a-108n may each be configured to execute corresponding user code 110a-110n. User code 110a-110n may represent, for example, an application or other process executing on associated processing cores 108a-108n. In some embodiments, the progress of the execution of the user code on one or more processing core (e.g., the progress of the execution of user code 110a on processing core 108a) may be visible to a user of computing device 100 (e.g., via a display or other output device, not shown). In some embodiments, an operating system (OS, not shown) may be responsible for the designation of user code to processing cores.

Each of processing cores 108a-108n may include BT task identification logic 112a-112n, which may identify BT tasks associated with user code 108a-108n while the user code 108a-108n is executing on processing cores 108a-108n, respectively. A BT task may include, for example, one or more operations involved in emulating a set of machine readable instructions of a set of code through translation and/or analysis of that set of code. In various embodiments, a set of code may include a set of instructions, a subset of a larger set of instructions, portions of combinational and/or sequential logic, subroutines, or called functions, for example. In some embodiments, a BT task may be directed toward enabling code written for a source computing architecture to run on a target computing architecture (e.g., the architecture of computing device 100). A BT task may include a dynamic BT task and/or a static BT task. As used herein, a BT task may include a binary analysis task. In some embodiments, a BT task identified by BT task identification logic 112a-112n may include translation of a portion of the set of code into another set of code. In some embodiments, a BT task identified by BT task identification logic 112a-112n may include evaluating a performance characteristic of the set of code, for example. In some embodiments, a BT task identified by BT task identification logic 112a-112n may include boosting the performance of the set of code by at least partially reorganizing and/or editing the set of code. In some embodiments, a BT task identified by BT task identification logic 112a-112n may include adding additional security features to the set of code. For example, in some embodiments, BT task identification logic 112a-112n may identify markers of improper behavior in the set of code that may be a sign of malware execution of other malicious intervention.

Computing device 100 may include BT task queue 122. In some embodiments, BT task queue 122 may include a memory configured to store one or more BT tasks identified by BT task identification logic 112a-112n. The BT task(s) in BT task queue 122 may be added to and removed from BT task queue 122 as the tasks are identified and processed by one or more of processing cores 108a-108n. For example, a BT task may be placed in BT task queue 122 by BT task identification logic 112a of processing core 108a, and may be removed from BT task queue 122 and processed by idle core task processing (ICTP) logic 120b of processing core 108b. Embodiments of ICTP logic 120 are discussed in further detail below. In some embodiments, BT task queue 122 may be implemented in software, in hardware, or in a combination of software and hardware. BT tasks in BT task queue 122 may be stored with data representative of the relative priorities of different tasks (which may be used by processing cores 108a-108n to determine which tasks to remove first as long as other constraints, such as processing power, are satisfies) and/or data representative of portions of different tasks that have been already processed (e.g., when processing of a task was previously initiated but interrupted before completion).

In some embodiments, not all BT tasks identified by BT task identification logic 112a-112n may be placed in BT task queue 122. For example, BT task identification logic 120a (associated with processing core 108a) may determine that a particular BT task should be processed immediately or soon by associated processing core 108a. The particular BT task may then be executed by processing core 108a without placing the BT task in BT task queue 122. One example of a BT task that may be suitable for immediate processing on the processing core on which the BT task was identified, in some embodiments, may be a task that involves transforming a serial portion of code into a parallel implementation; in such a case, the processing core on which the BT task was identified may immediately look for another processing core with which to execute the parallel implementation.

Returning to processing cores 108a-108n, each of processing cores 108a-108n may include idle core detection (ICD) logic 116a-116n, respectively. In some embodiments, ICD logic 116 may monitor a state of associated processing core 108. Example states of processing cores 108a-108n may include an active state, a halt state, a stop clock state, a sleep state, a voltage-scaled state or a frequency-scaled state. Additional examples include the C-states and/or P-states described in the Advanced Configuration and Power Interface (ACPI) Specification, version 5.0, published Dec. 6, 2011, incorporated by reference herein in its entirety. Different ones of processing cores 108a-108n may be in different states. For example, in some embodiments, processing core 108a may be in an active state while processing core 108b may be in a sleep state.

As used herein, a processing core may be considered to be in an "active" or "non-idle" state when the processing core is currently useable for data processing by an operating system or an application running through an operating system (for example, executing user code) and/or the processing core is maximally powered in accordance with a current power setting for the processing core. A power setting of a processing core may determine, for example, an operating voltage for the processing core and/or an operating frequency for the processing core. In some embodiments, these power settings may include the "P-states" defined in the ACPI Specification. In some embodiments, a processing core in an active state may have different achievable performance levels corresponding to different power settings. Resources that may be adjusted under in the transition between "active" and "idle" may include main clocks, internal clocks, external clocks, bus devices, operating voltages, memory caches, etc. As used herein, "idle" or "idle state" may refer to any state other than an "active" or "non-idle" state. In some embodiments, a state of a processing core may include the "C-state" of the processing core as defined in the ACPI Specification. For example, an active state may include the C0 state, while idle states may include the C1, C2, . . . C7 states (in which power draw and processing core wake time are traded off in various combinations).

In some embodiments, ICD logic 116a-116n may determine which, if any, of processing cores 108a-108n are idle. In some embodiments, ICD logic 116 may be configured to trigger a change in the state of associated processing core 108. In some embodiments, ICD logic 116 may be configured to determine whether a change in a state of associated processing core 108 is consistent with a power management (PM) objective, and/or configured to determine a state to which associated processing core 108 may change to maintain consistency with a PM objective. In some embodiments, one or more of ICD logic 116a-116n may be coupled with PM logic 102, and may query PM logic 102 to identify a PM objective of computing device 100. Various embodiments of ICD logic 116 and PM logic 102 are discussed in further detail below.

Each of processing cores 108a-108n may include idle core task processing (ICTP) logic 120a-120n, respectively. In some embodiments, ICTP logic 116 may be configured to process a BT task taken from BT task queue 122. This processing may occur when processing core 108 associated with ICTP logic 120 is determined to be in an idle state (by, for example, ICD logic 116). The BT task processed by ICTP logic 116 may not have been placed in BT task queue 122 by the associated BT task identification logic; for example, ICTP logic 120b (associated with processing core 108b) may be configured to execute a BT task identified by BT task identification logic 112a (associated with processing core 108ba. In some embodiments, ICTP logic 120 may be configured to communicate with PM logic 102 to identify a PM objective of computing device 100, and to determine whether a task from BT task queue 122 may be processed while achieving consistency with the PM objective. ICTP logic 120 may be further configured to portion a BT task into subtasks, one or more of which may be processed while achieving consistency with the PM objective. ICTP logic 120 may be further configured to stop processing a BT task when a request for associated processing core 108 is received (e.g., from an OS, other processor, or outside interrupt source). In some embodiments, ICTP logic 120 may utilize the same processing, memory, and data transfer resources as are utilized for execution of the associated user code 110a. Various embodiments of ICTP logic 120 are discussed in further detail below.

Computing device 100 may include BT cache 114. Processing cores 108a-108n may access BT cache 114 to retrieve the outputs of previously-executed BT tasks during execution of associated user code 110a-110n in order to, for example, speed up or otherwise improve the execution of user code 110a-110n. Outputs stored in BT cache 114 may include, for example, translated portions of code. In some embodiments, BT cache 114 includes multiple separate caches, each associated with one or more of processing cores 108a-108n. In some embodiments, the outputs stored in BT cache 114 may have been generated by BT tasks executed by one or more of idle core task processing (ICTP) logic 120a-120n. In some embodiments, the outputs stored in BT cache 114 may have been generated by BT tasks executed intermittently by processing core 108 during the execution of associated user code 110 (for example, according to the typical pause-and-resume operation described above).

Computing device 100 may include power management (PM) logic 102. PM logic 102 may be configured to implement various mechanisms for adjusting the power consumption of computing device 100 based on, for example, available power sources and performance objectives. For example, in some embodiments, PM logic 102 may implement the technology for PM specified in the ACPI Specification, discussed above. PM logic 102 may implement PM techniques in addition to or instead of those specified by ACPI. In some embodiments, PM logic 102 may be included in, or may include, a power control unit (PCU) of computing device 100.

PM logic 102 may include performance target logic 104. In some embodiments, performance target logic 104 may store data representative of a target performance level of computing device 100. A target performance level of computing device 100 may specify, for example, a target display brightness, a target energy consumption (for example, a per hour energy consumption, or target operating life), a target speaker volume, a target strength for one or more wireless communication antennas, etc. As used herein, a "target" may include a desired value, a maximum value, or a minimum value, as appropriate. In some embodiments, a target performance level may be based on or specified by a power plan or profile set by a user or automatically set by computing device 100. For example, an OS running on computing device 100 may include pre-determined performance target levels that correspond to "energy saving," "balanced performance/power consumption," and "high performance" profiles.

PM logic 102 may include power supply state logic 106. In some embodiments, power supply state logic 106 may store data representative of one or more power supplies of computing device 100. For example, power supply state logic 106 may store information about the total battery capacity of computing device 100, the remaining battery power available to computing device 100, whether computing device 100 is currently powered by access to wall power or another power source, such as a solar panel, the estimated operational time remaining for device 100 (under current states and/or power settings, or projected states and/or power settings), etc. In some embodiments, the target performance levels of performance target logic 104 may be based on power supply data from power supply state logic 106.

PM logic 102 may include state change logic 118. In some embodiments, state change logic 118 may receive commands or queries related to PM from an OS executing on computing device 100 (not shown) or other components in communication with PM logic 102 (such as peripheral devices or other processing devices included in computing device 100). For example, PM logic 102 may receive a request from the OS to change the state of one or more of processing cores 108a-108n. A change in the state of a processing core may include, for example, a change from a current non-idle state to an idle state (due to, for example, the elapse of a given period of time, inactivity, or user selection of an idle state). A change in the state of a processing core may include, for example, a change from a current idle state to a non-idle state (due to, for example, moving a mouse, pressing a key on the keyboard, receiving a message, or receiving a query from a remote system administrator). In some embodiments, a state change request may take the form of an interrupt supplied to PM logic 102 or supplied directly to the relevant ones of processors 108a-108n and monitored by PM logic 102. Such a request may be triggered in response to, for example, a manual "wake-up" of computing device 100 by a user or process. In some embodiments, a state change request may take the form of a monitor hit, which may occur when a monitor wait (MWAIT) function (which may be executed by circuitry included in hardware supporting processing cores 108a-108n) detects the presence of a predetermined event upon which computing device 100 is to be woken up. In some embodiments, the predetermined event is set through a MONITOR instruction. In some embodiments, state change logic 118 may transmit PM commands (e.g., state change commands) to one or more of processing cores 108a-108n.

Figure 2:
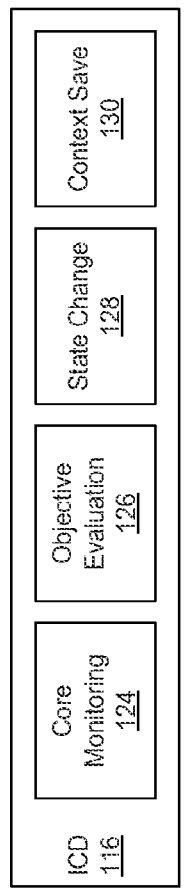

Referring now to FIG. 2, a block diagram is illustrated of additional components included in an embodiment of ICD logic 116 (FIG. 1). As shown, ICD logic 116 may include core monitoring logic 124. In some embodiments, core monitoring logic 124 may monitor associated processing core 108 to determine the current state of associated processing core 108. In particular, core monitoring logic 124 may be configured to identify when associated processing core 108 is in an idle state. In some embodiments, the core monitoring logic associated with one processing core may monitor the state of other processing cores; for example, the core monitoring logic of ICD logic 116a (associated with processing core 108a) may monitor the state of processing core 108b. In some embodiments, core monitoring logic 124 may receive data representative of the state of one or more of processing cores 108a-108n from PM logic 102, which may include such data in a memory accessible to performance target logic 104 and/or state change logic 118, for example.

ICD logic may include objective evaluation logic 126. In some embodiments, objective evaluation logic 126 may identify a PM objective of computing device 100 and determine whether the state of associated processing core 108 (or any other processing core, in some embodiments) may be changed while achieving consistency with the PM objective. In some embodiments, a PM objective of computing device 100 may be achieving the target performance level for computing device 100 stored in performance target logic 104 of PM logic 102. Core monitoring logic 124 and/or objective evaluation logic 126 may query PM logic 102 for such performance-related data. In some embodiments, objective evaluation logic 126 may determine whether changing a state of associated processing core 108 to a different state is consistent with the PM objective by determining whether changing the state of associated processing core 108 to the different state will result in the violation of the PM objective. For example, if processing core 108 is currently in a particular idle state and is only capable of processing data when in a single "active" state, objective evaluation logic 126 may determine whether the power consumption that will result from changing the state of processing core 108 from the particular idle state to the active state will exceed an upper limit on the power consumption specified by a PM objective.

In some embodiments, a PM objective of computing device 100 is not identified solely by querying PM logic 102, but may be determined by objective evaluation logic 126 based on data from PM logic 102 (such as target performance level data from performance target logic 104 and/or power supply state data from power supply state logic 106). Core monitoring logic 124 and/or objective evaluation logic 126 may query PM logic 102 for such power- and/or performance-related data. For example, in some embodiments, power supply state logic 106 of PM logic 102 may indicate that computing device 100 is operating from a battery with only 5% remaining; in view of this data, objective evaluation logic 126 may determine that no processing cores should be transitioned from idle into non-idle states for performing BT tasks until the battery is recharged to a sufficient value (e.g., a predetermined threshold, such as 60%).

In some embodiments, processing core 108 may have more than one non-idle state. For example, one non-idle state may consume more power and have a shorter start-up time, while a second non-idle state may consume less power but have a longer start-up time. In such embodiments, instead of having a pre-determined non-idle state, objective evaluation logic 126 may determine a desired non-idle state based on, for example, a PM objective (as determined by querying PM logic 102 and/or analysis by objective evaluation logic 126), one or more BT tasks in BT task queue 122 which associated processing core 108 may be assigned, and/or the current state of associated processing core 108. In this manner, in some embodiments, ICD logic 116 may identify a non-idle state for associated processing core 108 that allows processing core 108 to execute a BI task from BT task queue 122 while achieving consistency with a PM objective.

ICD logic may include state change logic 128. In some embodiments, when associated processing core 108 is in an idle state, BT task queue 122 includes a BT task suitable for processing by associated processing core 108, and objective evaluation logic 126 determines that changing the state of associated processing core 108 from the current idle state to a non-idle state will be consistent with a PM objective, state change logic 128 may trigger a change of the state of associated processing core 108 to the non-idle state. In some embodiments, the state into which processing core 108 changes for BT task processing may depend on the architecture of computing device 100. For example, some architectures may allow a processing core to enter a state in which all clocks internal to the processing core are stopped and an operating voltage of the processing core is reduced, while other architectures may not provide for such a state. Processing core states, and the transitions between states, may be governed by micro-architectural features that may differ for each processing core. In some embodiments, computing device 100 may include logic that is always on (even when one or more of processing cores 108a-108n has a very low power setting and/or is in an idle state) and that monitors for one or more "wake-up" events; when such an event is detected, the logic may activate various parts of computing device 100 until one or more of processing cores 108a-108n are running again. In "shallow" idle states, this activation may only include turning one or more clocks back on, while in "deeper" idle states, this activation may include re-loading processing core context information back into one or more of processing cores 108a-108n before processing cores 108a-108n resume running.

In some embodiments, state change logic 128 changes a state of associated processing core 108 by changing a context of associated processing core 108. As used herein, the "context" of a processing core may refer to properties of the processing core that may be saved and later restored. In some embodiments, when a switch between normal operation and BT task processing occurs for processing core 108, the context of processing core 108 may be stored in a memory so that the context may be restored when processing core 108 returns to normal operation. In some embodiments, this context storage/restoration may be performed by and/or triggered by microcode or other firmware or hardware support, which may intervene when a state change is desired. In some embodiments, the context of processing core 108 may be hidden from an OS and/or a user of computing device 100. In some embodiments, changes in state (e.g., changes in context) may be implemented by a software-controlled switch (using, e.g., virtualization extensions). In some embodiments, changes in state may be implemented by a hardware-assisted switch (using, e.g., microcode or p-code functions to enter a specified state).

ICD logic 116 may include context save logic 130. In some embodiments, when associated processing core 108 is interrupted during processing of a BT task from BT task queue 122, processing core 108 may store its context via context save logic 130 so that the context may be resumed when state change logic 128 next changes processing core 108 from an idle mode into a non-idle mode for executing queued BT tasks.

Figure 3:
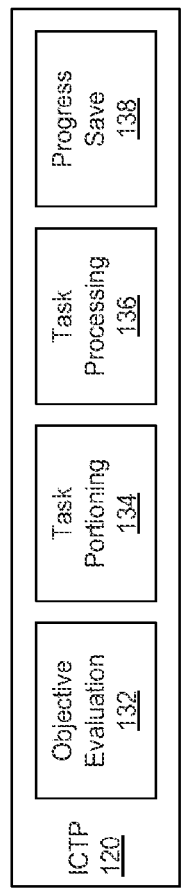

Referring now to FIG. 3, a block diagram is illustrated of additional components included in an embodiment of ICTP logic 120 (FIG. 1). In some embodiments. ICTP logic 120 may allow BT tasks to be processed on otherwise idle processing cores, effectively hiding the latency of the BT tasks by taking the execution of the BT tasks out of the critical path of an active system-level or user-level application executing on a non-idle processing core.

ICTP logic 120 may include objective evaluation logic 132. Like objective evaluation logic 126 of ICD logic 122 (FIG. 2), objective evaluation logic 132 may identify a PM objective of computing device 100. However, in some embodiments, objective evaluation logic 132 may focus on the particular contours of a BT task retrieved from BT queue 122, and in particular, whether that task may be processed while achieving consistency with the PM objective. In some embodiments, objective evaluation logic 132 of ICTP logic 120 may only be activated after associated processing core 108 has been changed into a non-idle state by ICD logic 116 in anticipation of executing a BT task. As discussed above with reference to objective evaluation logic 126, in some embodiments, a PM objective may be determined directly from querying PM logic 102 or by analyzing data supplied by PM logic 102.

In some embodiments, objective evaluation logic 132 may determine whether the next BT task in BT task queue 122 can be processed while achieving consistency with the PM objective. For example, objective evaluation logic 132 may determine that the expected processing time of the next task in BT task queue 122 (based on, for example, a type of the task or the amount of user code referred to in the task) will require an amount of processing time that does or does not exceed the processing time available without unduly draining a battery or having to compromise other performance characteristics (such as display brightness). If the BT task may be processed while achieving consistency with the PM objective, task processing logic 136 may proceed to process the task. In some embodiments, if the BT task that is next in BT task queue 122 may not be processed while achieving consistency with the PM objective, objective evaluation logic 132 may consider other BT tasks in BT task queue 122; if any one of them may be processed while achieving consistency with the PM objective, task processing logic 136 may proceed to process such task.

In some embodiments, when objective evaluation logic 132 determines that processing the next (or any) BT task in BT task queue 122 is not consistent with the PM objective, control may be passed to task portioning logic 136. Task portioning logic 136 may attempt to portion one or more of the BT tasks in BT task queue 122 into subtasks that require fewer processing resources than the original task(s) (e.g., less processing time, or lower processing speeds). In some embodiments, a BT task may be portioned into "state collection" subtasks and "processing" subtasks. State collection subtasks may include tasks for collecting all necessary data for later processing (which may involve, for example, saving a context of a processing core and a portion of a native memory space). Processing subtasks may utilize the data collected during execution of a state collection subtask; in some embodiments, a processing subtask need not use any data other than data collected by a state collection subtasks. In some embodiments, a state collection subtask may require less time to execute than a processing subtask. If task portioning logic 136 determines that one or more of the subtasks may be processed while achieving consistency with the PM objective, task processing logic 136 may proceed to process such subtask.

ICTP logic 120 may further include progress save logic 138. In some embodiments, when associated processing core 108 is interrupted during processing of a BT task from BT task queue 122, processing core 108 may store the progress of the partially completed BT task via progress save logic 138 so that the BT task may be resumed when ICTP logic 120 is next invoked to process BT tasks.

The BT task processing systems and techniques described herein may be advantageously implemented in multi-core computing environments. As indicated above with reference to FIG. 3, when processing core 108 is processing a BT task from BT task queue 122, processing core 108 is in a non-idle state. However, PM logic 102 may not be aware of this, nor may an OS running on computing device 100. By interposing ICD logic 116 and ICTP logic 120 between PM logic 102 and processing core 108, and/or between an OS and processing core 108, ICD logic 116 and ICTP logic 120 may use idle resources without notifying or otherwise disrupting PM logic 102 and/or an OS. In addition, in some embodiments, by evaluating the power and performance implications separately (using, for example, objective evaluation logic 126 of ICD logic 116 and/or objective evaluation logic 132 of ICTP logic 120), the use of processing core resources for BT task processing during otherwise idle periods may achieve consistency with PM objectives set by the OS, PM logic 102, or a combination. In some embodiments, offloading BT tasks to available processing cores may help distribute the thermal load across cores, and thereby improve the reliability of computing device 100.

Further, by querying and monitoring several components of computing device 100 for power-related data (e.g., PM logic 102 for performance target and power supply state data, and processing cores 108a-108n for state data), and using this data to make BT task processing decisions, some embodiments of the BT task processing systems and techniques disclosed herein may minimize the visible impact of BT task processing on the operation of computing device 100. Power usage and the user experience may thereby be improved, while allowing a binary translator to implement more complex BT operations without significant performance tradeoffs. Conventional platforms, many of which are architecturally constrained such that no component is aware of one or more of processor core states, power supply data, and PM objectives, are unable to achieve these advantages.

Embodiments of the BT task processing systems and techniques disclosed herein may be particularly advantageous in multi-core environments in which a common power plane is provided for two or more processing cores. For example, processing cores in conventional multi-core platforms are often arranged in pairs, with a single power plane provided per pair. When a first processing core of the pair is set to a particular non-idle state, the second processing core of the pair is set to the same non-idle state, regardless of whether the second processing core is executing any code. The BT task processing systems and techniques disclosed herein may take advantage of the second processing core being in a non-idle state (but otherwise unused) to perform BT task processing on the second core without imposing an additional power burned on the computing device or interrupting the execution of user code on the first processing core.

Referring now to FIG. 4, an example timeline is illustrated of multi-core BT task processing operations, in accordance with various embodiments. For ease of illustration, the multi-core operations of FIG. 4 are discussed with reference to a computing device (such as computing device 100) with two processor cores, Core 0 and Core 1. In some embodiments, Core 0 and Core 1 are each CPU cores.

At time 0 (an arbitrary initial temporal reference point), both Core 0 and Core 1 are running. In some embodiments, "running" may include executing user or other code while in an active state. At times 0 through 2, the number of BT tasks in a BT task queue (such as BT task queue 122 of FIG. 1), as indicated in the "BT Queue Size" column, is 0. At time 3, a BT task is identified which is associated with the set of code executing on Core 0 (e.g., by BT task identification logic 112 of FIG. 1). This BT task is transferred to a BT task queue, as indicated by the new value of 1 in the "BT Queue Size" column at time 3. At time 3, Core 1 remaining running. At time 4, a BT task is identified which is associated with the set of code executing on Core 1. This BT task is transferred to a BT task queue, as indicated by the new value of 2 in the "BT Queue Size" column at time 4.

At time 5, Core 1 enters an idle state. This idle state may be detected by core monitoring logic of Core 1 (e.g., core monitoring logic 124 of FIG. 2). At the next time increment, time 6, task processing logic of Core 1 (e.g., task processing logic 136 of FIG. 3) removes a task from the BT task queue and begins to process it. In some embodiments, tasks may be removed from a BT task queue on a first-in-first-out (FIFO) basis, on a last-in-first-out (LIFO) basis, or on any other basis (e.g., selecting a task whose processing is consistent with achieving a PM objective, as discussed above). At time 7, Core 1 processes the BT task removed from the BT task queue, and completes the task at time 8, leaving one task remaining in the BT task queue. The duration of one time unit for processing a BT task is purely illustrative; all of the operations described herein may take varying amounts of time. The output of the processed BT task may be stored, for example, in BT cache 114 (FIG. 1).

At time 9, Core 1 removes the last remaining task from the BT task queue (as indicated by the "BT Queue Size" column at time 9. At time 10, Core 1 processes the BT task removed from the BT task queue, and completes the task at time 11, leaving the BT task queue empty. The output of the processed BT task may be stored, for example, in a BT cache. Core 0 has remain running since time 0, executing user code, for example. In this illustration, Core 0 continues to execute the user code through time 15, the last illustrated time unit.

At time 12, Core 1 detects an interrupt or monitor hit (e.g., via core monitoring logic 124). In some embodiments, an OS running on the computing device of Core 1 expects that Core 1 has remained in an idle state since time 5, and is not aware that Core 1 has been processing BT tasks between time 5 and time 11. In order to preserve the semantics of idle/non-idle states as seen by the OS, Core 1 may respond to the interrupt or monitor hit at time 12 by changing state (e.g., via state change logic 128 of ICD logic 116, or state change logic 118 of PM logic 102) into whatever non-idle state is expected by the OS (or other interrupting component) in response to an interrupt or monitor hit. At time 13, Core 1 resumes executing user code (designated by the OS, for example), and continues to do so, through time 15, the last illustrated time unit.

Figure 5:
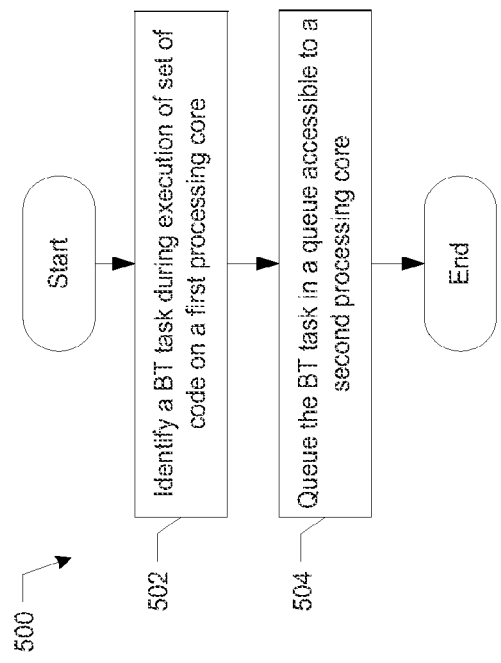
FIG. 5 is a flow diagram of example BT task queuing operations, in accordance with various embodiments.

Referring now to FIG. 5, a flow diagram 500 is provided of example BT task queuing operations, in accordance with various embodiments. It may be recognized that, while the operations of flow diagram 500 (and the other flow diagrams described herein) are arranged in a particular order and illustrated once each, in various embodiments, one or more of the operations may be repeated, omitted or performed out of order. For illustrative purposes, operations of flow diagram 500 may be described as performed by various components of computing device 100, such as BT task identification logic 112*a* of processing core 108*a* and 108*b* (FIG. 1), but the operations of flow diagram 500, including individual operations of flow diagram 500, may be performed by any suitably configured component or combination of components of computing device 100.

The operations of flow diagram 500 may begin at operation 502 in which BT task identification logic 112*a* may identify a BT task to be processed, the BT task associated with a set of code (e.g., user code 110*a*) during execution of the set of code on processing core 108*a* of computing device 100. At operation 504. BT task identification logic 112*a* may queue the BT task in a BT task queue (such as BT task queue 122) accessible to any of processing cores 108*b*-108*n* (different processing cores than processing core 108*a*) of computing device 100. The operations of flow diagram 500 may then end.

Figure 6:
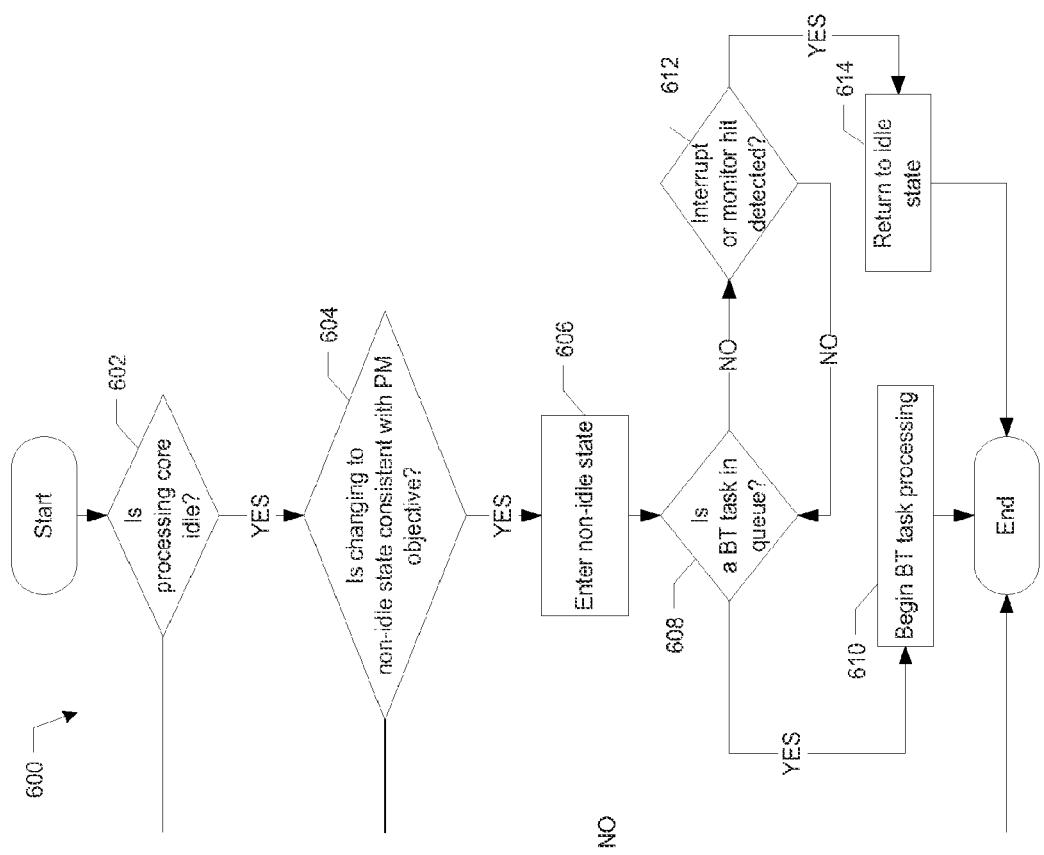
FIG. 6 is a flow diagram of first example objective evaluation operations, in accordance with various embodiments.

As discussed above, in some embodiments, objective evaluation logic 126 of ICD logic 116 and/or objective evaluation logic 132 of ICTP logic 120 may evaluate a PM objective against a BT task to be processed and/or a change of state involved in processing the BT task to determine whether BT task processing can be performed consistently with the PM objective. In some embodiments, objective evaluation logic 126 of ICD logic 116 may determine whether simply changing the state of an idle processing core to a non-idle state may be inconsistent with a PM objective; if not, the processing core may be changed to a non-idle state and the processing core may wait for BT tasks to appear in BT task queue 122. FIG. 6, discussed below, illustrates example operations associated with some such embodiments.

Figure 7:
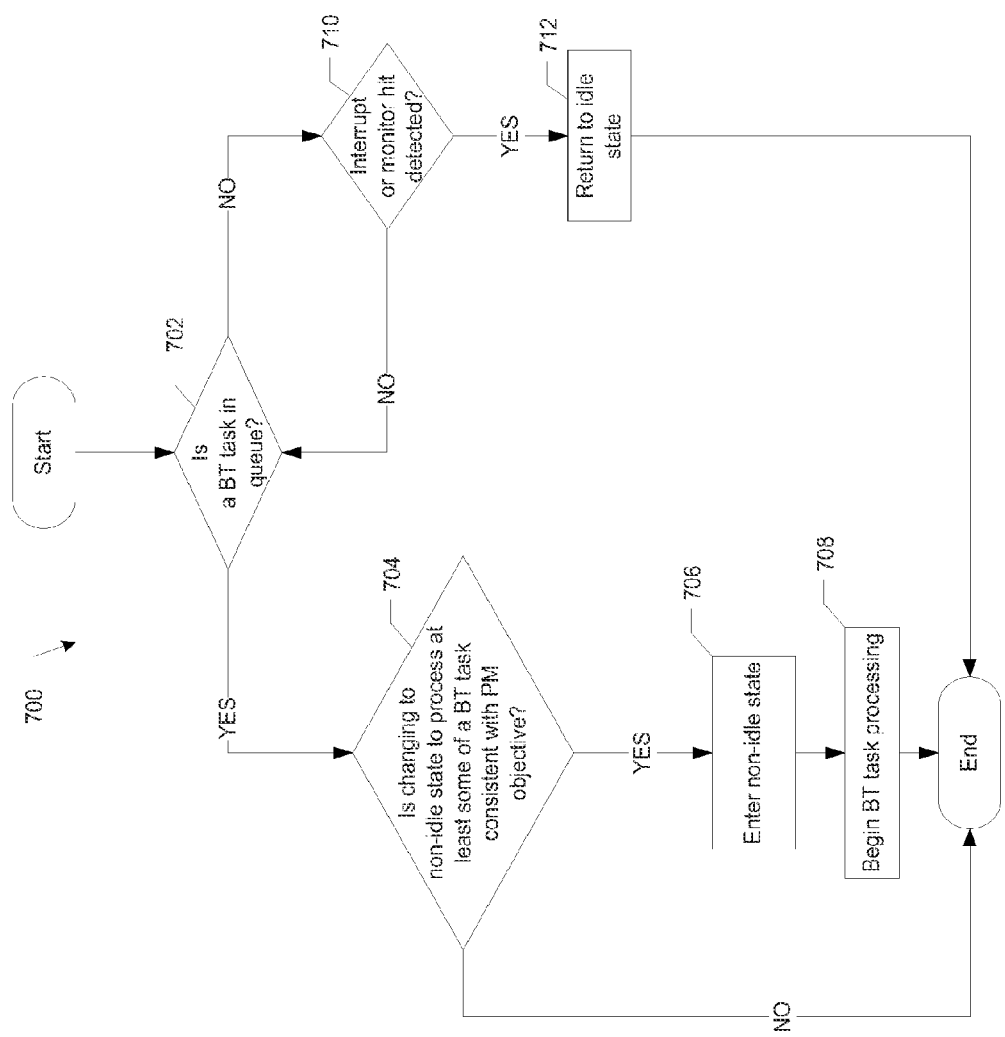
FIG. 7 is a flow diagram of second example objective evaluation operations, in accordance with various embodiments.

In some embodiments, an idle processing core may not transition to a non-idle state until a BT task is detected in BT task queue 122; if some of the BT task may be processed consistently with a PM objective, the idle processing core may enter a non-idle state and begin BT task processing. FIG. 7, discussed below, illustrates example operations associated with some such embodiments. Note that some embodiments may include one or more of the operations of both FIGS. 6 and 7 (e.g., embodiments in which an initial state change is made when a processing core is idle, and further state changes may be made to match additional or other PM objectives or the contours of a particular BT task in BT task queue 122).

Referring now to FIG. 6, a flow diagram 600 is provided of first example objective evaluation operations, in accordance with various embodiments. For illustrative purposes, operations of flow diagram 600 may be described as performed by various components of computing device 100, such as ICD logic 116*b* and ICTP logic 120*b* of processing core 108*b* (FIGS. 1 and 3), but the operations of flow diagram 600, including individual operations of flow diagram 600, may be performed by any suitably configured component or combination of components of computing device 100. Using processing core 108*b* in the discussion of FIG. 6 is for continuity with FIG. 5 and is purely illustrative; the operations of flow diagram 600 may be executed any of processing cores 108*a*-108*n* or other suitably configured processing cores.

The operations of flow diagram 600 may begin at 602, at which ICD logic 116*b* may determine whether processing core 108*b* is in an idle state. In some embodiments, the operations of flow diagram 600 may be triggered when ICD logic 116*b* detects an idle trigger from PM logic 102, an OS, state change logic 128 of ICD logic 116*b*, or another source. In some embodiments, an idle trigger may include a HALT command or an MWAIT command, for example. In some embodiments, the operations of flow diagram 600 may be triggered periodically or aperiodically to determine if processing core 108*b* should transition out of the idle state. A number of example triggers for a processing core to enter an idle state are discussed above with reference to FIGS. 1-3. If processing core 108*b* is not idle, the operations of flow diagram 600 may end.

If ICD logic 116*b* determines at operation 602 that processing core 108*b* is idle, objective evaluation logic 126 of ICD logic 116 may determine, at operation 604, whether changing the state of processing core 108*b* to a non-idle state is consistent with a PM objective. The PM objective evaluated at operation 604 may take the form of any of the embodiments discussed above with reference to FIGS. 1 and 2. For example, in some embodiments, operation 604 may include querying a PM logic (e.g., PM logic 102) for data representative of a target performance level of computing device 100

(e.g., from performance target logic 104) or data representative of a power supply of computing device 100 (e.g., from power supply state logic 106). The determination of operation 604 may include determining whether changing the state of processing core 108b to a particular non-idle state will be inconsistent with the PM objective. In various embodiments, the particular non-idle state may be a "worst-case scenario" state (e.g., a state of processing core 108b that draws the most power during processing), an "average" state, a "likely" state (e.g., based on the state typically appropriate for BT task processing), or any other predetermined or dynamically determined state. In some embodiments, the determination of operation 604 may not depend on any particular BT task in BT task queue 122. Indeed, in some embodiments, the determination of operation 604 may not depend on whether there are any tasks in BT task queue 122.

If objective evaluation logic 126 determines at operation 604 that changing the state of processing core 108b is inconsistent with a PM objective, the operations of flow diagram 600 may end. If objective evaluation logic 126 determines at operation 604 that changing the state of processing core 108b is consistent with a PM objective, state change logic 128 of ICD logic 116 may instruct processing core 108b to enter a non-idle state at operation 606. In some embodiments, the non-idle state entered into at operation 606 may be the non-idle state evaluated at operation 604, as described above. In some embodiments, the non-idle state entered into at operation 606 may not be the state evaluated at operation 604; instead, the non-idle state entered into at operation 606 may be, e.g., a state that consumes less power than the state evaluated at operation 604.

At operation 608, task processing logic 136 of ICTP logic 120b may determine whether there is a BT task in a BT task queue (such as BT task queue 122 of FIG. 1). If there is no BT task for processing, core monitoring logic 124 of ICD logic 116b may execute operation 612 and monitor for an interrupt, monitor hit, or other event that is intended to trigger processing core 108b to return to being controlled by the OS. If such a trigger is detected at operation 612, state change logic 128 of ICD logic 116b or state change logic 118 of PM logic 102 may change the state of processing core 108b such that processing core 108b may return to an idle state (consistent with the expectations of an OS of computing device 100) at operation 614, and the operations of flow diagram 600 may then end. If core monitoring logic 124 does not detect an interrupt, monitor hit, or other event at operation 612, task processing logic 136 may return to operation 608 and determine whether there is a BT task in a BT task queue. Processing core 108b may remain in a non-idle state through execution of operation 608.

If task processing logic 136 of ICTP logic 120b determines that there is a BT task in a BT task queue at operation 608, task processing logic 136 may proceed to operation 610 and begin processing at least some of one or more BT tasks in the BT task queue. In some embodiments, operation 610 may include some or all of the operations of flow diagram 800 of FIG. 8, discussed below. The operations of flow diagram 600 may then end.

Referring now to FIG. 7, a flow diagram 700 is provided of second example objective evaluation operations, in accordance with various embodiments. Like flow diagram 600 of FIG. 6, for illustrative purposes, operations of flow diagram 700 may be described as performed by various components of computing device 100, such as ICD logic 116b and ICTP logic 120b of processing core 108b (FIGS. 1 and 3), but the operations of flow diagram 600, including individual operations of flow diagram 600, may be performed by any suitably configured component or combination of components of computing device 100. Using processing core 108b in the discussion of FIG. 7 is for continuity with FIG. 5 and is purely illustrative; the operations of flow diagram 700 may be executed any of processing cores 108a-108n or other suitably configured processing cores. As discussed above with reference to FIG. 6, in some embodiments, the operations of flow diagram 700 may be triggered when ICD logic 116b detects an idle trigger from PM logic 102, an OS, state change logic 128 of ICD logic 116b, or another source. In some embodiments, an idle trigger may include a HALT command or an MWAIT command, for example. A number of example triggers for a processing core to enter an idle state are discussed above with reference to FIGS. 1-3. In some embodiments, the operations of flow diagram 700 may be triggered periodically or aperiodically to determine if there are BT tasks for processing core 108b to process.

The operations of flow diagram 700 may begin at 702, at which task processing logic 136 of ICTP logic 120b may determine whether there is a BT task in a BT task queue (such as BT task queue 122 of FIG. 1. If task processing logic 136 determines that there is no BT task in a BT task queue at operation 702, core monitoring logic 124 of ICD logic 116b may execute operation 710 and monitor for an interrupt, monitor hit, or other event that is intended to trigger processing core 108b to return to being controlled by the OS. If such a trigger is detected at operation 710, state change logic 128 of ICD logic 116b or state change logic 118 of PM logic 102 may change the state of processing core 108b such that processing core 108b return to an idle state (consistent with the expectations of an OS of computing device 100) at operation 712, and the operations of flow diagram 700 may then end. If core monitoring logic 124 does not detect an interrupt, monitor hit, or other event at operation 710, task processing logic 136 may return to operation 702 and determine whether there is a BT task in a BT task queue. Processing core 108b may remain in a idle state through execution of operation 702.

If task processing logic 136 of ICTP logic 120b determines that there is a BT task in a BT task queue at operation 702, task processing logic may proceed to operation 704 and determine, whether changing the state of processing core 108b to a non-idle state to process at least some of the one or more BT tasks in the BT task queue is consistent with a PM objective. Embodiments of how a non-idle state may be identified for evaluation at operation 704, and/or how consistency with the PM objective may be determined, are described in detail below with reference to FIG. 9.

If objective evaluation logic 126 determines at operation 704 that changing the state of processing core 108b is inconsistent with a PM objective, the operations of flow diagram 700 may end. If objective evaluation logic 126 determines at operation 704 that changing the state of processing core 108b is consistent with a PM objective, state change logic 128 of ICD logic 116 may instruct processing core 108b to enter a non-idle state at operation 706. In some embodiments, the non-idle state entered into at operation 706 may be the state evaluated at operation 704, as described above. At operation 708, ask processing logic 136 may begin processing at least some of one or more BT tasks in the BT task queue. In some embodiments, operation 610 may include some or all of the operations of flow diagram 800 of FIG. 8, discussed below. The operations of flow diagram 700 may then end.

Figure 8:
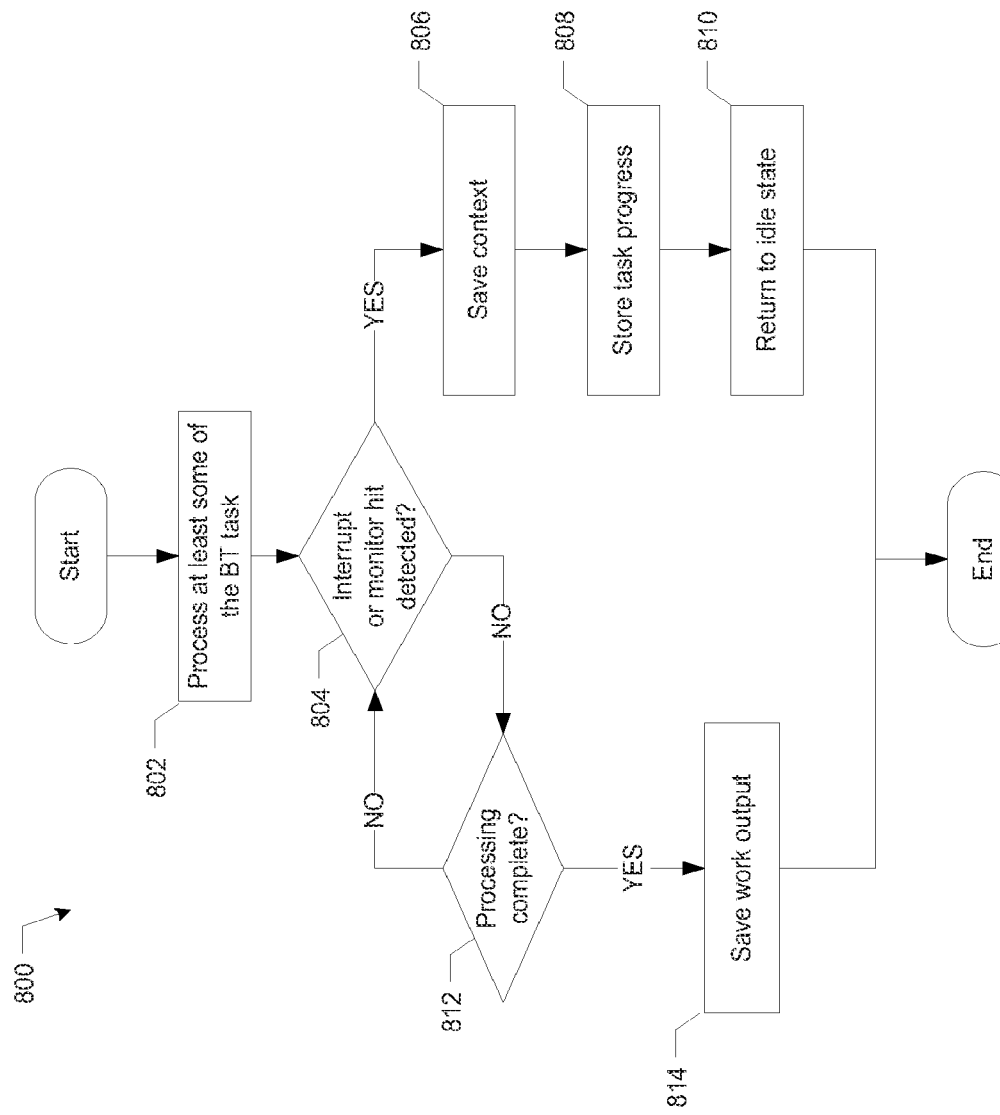
FIG. 8 is a flow diagram of example idle core task processing operations, in accordance with various embodiments.

Referring now to FIG. 8, a flow diagram 800 is provided of example idle core task processing operations, in accordance with various embodiments. The operations of flow diagram 800 may be performed when one or more BT tasks are queued in a BT task queue (such as BT task queue 122 of FIG. 1). For illustrative purposes, operations of flow diagram 800 may be described as performed by various components of computing device 100, such as ICD logic 116b and ICTP logic 120b of processing core 108b (FIGS. 1 and 3), but the operations of flow diagram 800, including individual operations of flow diagram 800, may be performed by any suitably configured component or combination of components of computing device 100. Using processing core 108b in the discussion of FIG. 8 is for continuity with FIGS. 5, 6 and 7 and is purely illustrative; the operations of flow diagram 800 may be executed any of processing cores 108a-108n or other suitably configured processing cores. In some embodiments, the operations of flow diagram 600 may be performed upon executing operation 610 of FIG. 6 and/or upon executing operation 708 of FIG. 7. The operations of flow diagram 800 may begin at operation 802, in which task processing logic 136 of ICTP logic 120b may process at least some of a BT task in BT task queue 122 using processing core 108b. As discussed above (and below with reference to FIG. 9), in some embodiments, processing at least some of a BT task at operation 802 may include processing a portion of a BT task. In some embodiments, processing at least some of a BT task using processing core 108b may occur in parallel with execution, by another processing core such as processing core 108a, of the set of code associated with the BT task.

At operation 804, core monitoring logic 124 of ICD logic 116b may monitor for an interrupt, monitor hit, or other event that is intended to trigger processing core 108b to return to being controlled by the OS. If such a trigger is detected at operation 804, task processing logic 136 may stop processing the BT task using processing core 108b. At operation 806, context save logic 130 of ICD logic 116b may save the context of processing core 108b for resumption at a later time. At operation 808, progress save logic 138 of ICTP 120b may save data representative of the progress of the processing of the BT task begun at operation 802. In some embodiments, the remainder of the BT task and the data representative of the progress of the processing may be requeued in BT task queue 122 so that the BT task may be completed by the next processing core that removes a BT task from BT task queue 122 for processing. In some embodiments, the remainder of the BT task and the data representative of the progress of the processing may be stored in a designated memory location so that the processing of the BT task may be resumed by processing core 108b (or any other of processing cores 108a-108n) the next time that processing core 108b (or any other processing core) is available to begin BT task processing (e.g., at operation 610 of FIG. 6 or operation 708 of FIG. 7). In such embodiments, BT task queue 122 may be considered to extend to include the designated memory location. At operation 810, state change logic 128 of ICD logic 116b or state change logic 118 of PM logic 102 may change the state of processing core 108b such that processing core 108b returns to OS control, and the operations of flow diagram 800 may then end.

If no trigger is detected at operation 804, task processing logic 136 may continue to process the BT task and may proceed to operation 812 to determine whether the processing of the BT task is complete. If the task is not yet complete, core monitoring logic 124 of ICD logic 116 may continue to monitor for an interrupt or monitor hit at operation 804. Once task processing logic 136 determines at operation 812 that the processing of the BT task is complete, task processing logic 136 may save the output of the BT task to a BT cache (such as BT cache 114) at operation 814 and the operations of flow diagram 800 may then end.

Figure 9:
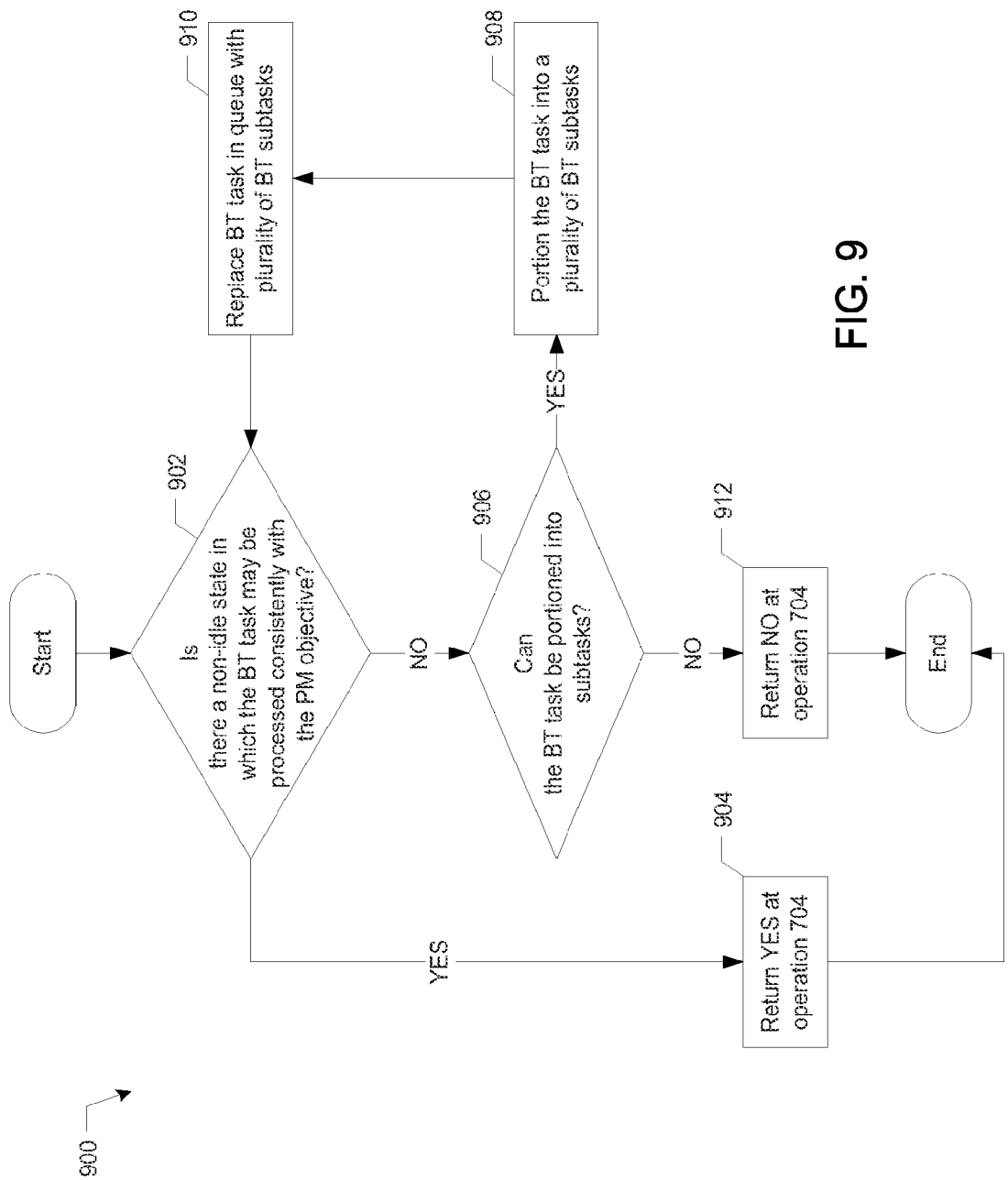
FIG. 9 is a flow diagram of example idle core BT task/objective evaluation operations, in accordance with various embodiments.

Referring now to FIG. 9, a flow diagram 900 is provided of example idle core task/objective evaluation operations, in accordance with various embodiments. In some embodiments, the operations of flow diagram 900 may be performed to determine whether changing to a non-idle state to process at least some of a BT task from a BT task queue 122 is consistent with a PM objective, such as part of executing operation 704 of FIG. 7. For illustrative purposes, operations of flow diagram 900 may be described as performed by various components of ICTP logic 120b of processing core 108b (FIGS. 1 and 3), but the operations of flow diagram 900, including individual operations of flow diagram 900, may be performed by any suitably configured component or combination of components of computing device 100. Using processing core 108b in the discussion of FIG. 9 is for continuity with FIGS. 5, 6, 7 and 8 and is purely illustrative; the operations of flow diagram 900 may be executed any of processing cores 108a-108n or other suitably configured processing cores.

The operations of flow diagram 900 may begin with operation 902, in which objective evaluation logic 132 of ICTP logic 120b may determine where there is a non-idle state into which processing core 108b may enter to process a BT task drawn from BT task queue 122 consistently with a PM objective. In some embodiments, only one non-idle state may be available to processing core 108b for processing BT tasks, in which case the determination of operation 902 will be made with respect to that non-idle state. In some embodiments, one or more non-idle states may be available to processing core 108b for processing BT tasks. In such embodiments, the determination of operation 902 may evaluate one or more of those non-idle states to determine which may be used to process a BT task consistently with the PM objective: if more than one may be so used, objective evaluation logic 132 may select one of the non-idle states as the state into which processing core 108b should transition to process a BT task (e.g., based on performance characteristics of the different non-idle states). In some embodiments, the determination of operation 902 may be based on the PM objective, the BT task and/or the current state of processing core 108b. For example, objective evaluation logic 132 may determine that, given a current, low-power state of processing core 108b, the next BT task in BT task queue 122 is complex and will require too much processing power to be adequately processed while maintaining consistency with the PM objective.

If objective evaluation logic 132 determines at operation 902 that where there is a non-idle state into which processing core 108b may enter to process a BT task drawn from BT task queue 122 consistently with a PM objective, objective evaluation logic 132 may proceed to operation 904 and return a value of "YES" at operation 704 of FIG. 7 or otherwise provide an indication that the processing of the BT task may proceed. The operations of flow diagram 900 may then end. If objective evaluation logic 132 determines at operation 902 that where there is no non-idle state into which processing core 108b may enter to process a BT task drawn from BT task queue 122 consistently with a PM objective, task portioning logic 134 may execute operation 906 and determine whether the BT task (evaluated at operation 902) may be portioned into subtasks. For example, a task that may require constant updates from an OS throughout the execution of the task may not be readily portioned. In such embodiments, task portioning logic 134 may determine at operation 906 that the BT task may not be portioned into subtasks, objective evaluation logic 132 may execute operation 904 and return a value of "NO" at operation 704 of FIG. 7 or otherwise provide an indication that the processing of at least some of a BT task may not proceed. If task portioning logic 134 determines at operation 906 that the BT task may be portioned into subtasks, task portioning logic 132 may proceed to operation 908 and may portion the BT task into a plurality of BT subtasks. In some embodiments, operation 906 may not be performed.

In some embodiments, task portioning logic 134 may perform the portioning of operation 908 with the objective of identifying a subtask of the BT task that may be processed using processing core 108b consistently with the PM objective. Task portioning logic 134 may then proceed to operation 910 and replace the original BT task in BT task queue 122 with the plurality of BT subtasks portioned at operation 908. Objective evaluation logic 132 may then reexecute operation 902, with BT task queue 122 updated to include the plurality of BT subtasks instead of the original BT task, and determine whether there is a non-idle state into which processing core 108b may transition to process at least some of a BT task in BT task queue 122 consistently with a PM objective. In some embodiments, BT subtasks may be broken down into further subtasks by additional iteration of operations 908 and 910.

Although much of the previous discussion has focused on systems and techniques for multi-core processing of BT tasks (e.g., analysis flows, code generation and/or optimization), the systems and techniques disclosed herein may be used, in some embodiments, for multi-core processing of other computing tasks instead of or in addition to BT tasks. For example, in some embodiments, the systems and techniques disclosed herein may be used for anti-virus tasks, security analysis tasks, offline profiling tasks, system reconfiguration tasks, data/cache movement tasks, backup tasks, etc.

Figure 10:
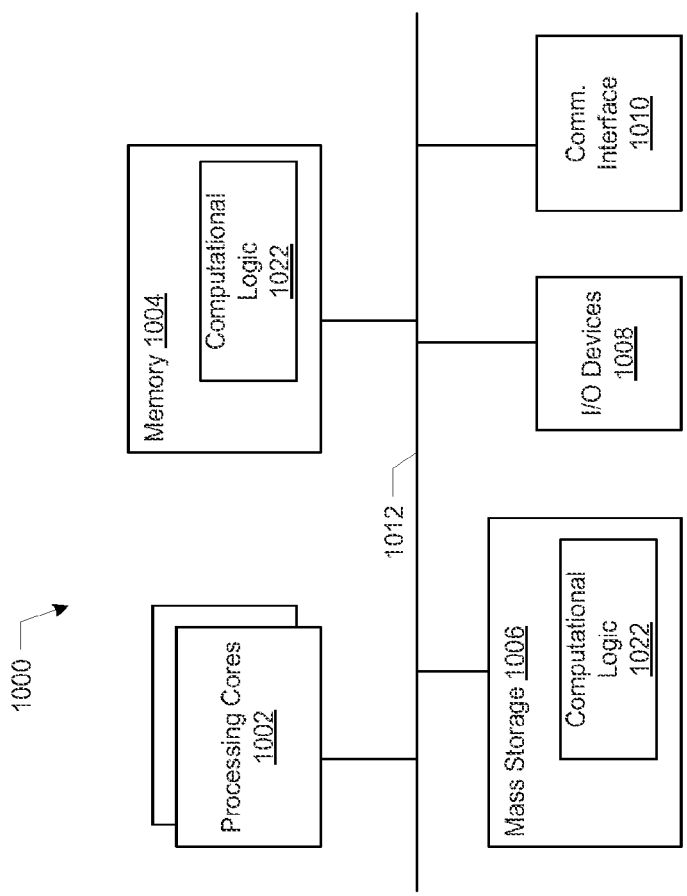
FIG. 10 is a block diagram of an example computing device suitable for practicing the disclosed embodiments, in accordance with various embodiments.

Referring now to FIG. 10, a block diagram is provided of an example computing device suitable for practicing the disclosed embodiments, in accordance with various embodiments. In various embodiments, computing device 1000 may be a server, desktop computer, laptop computer, tablet computer, cell phone, smartphone, personal digital assistant, game console, Internet appliance, mobile internet device or other computing device.

As shown, computing device 1000 includes a number of processing cores 1002, and system memory 1004. Processing cores 1002 may be configured as described above with reference to processing cores 108a-108n. Additionally, computing system 1000 may include mass storage devices 1006 (such as diskette, hard drive, compact disc read only memory (CDROM) and so forth), input/output devices 1008 (such as display, keyboard, cursor control and so forth) and communication interfaces 1010 (such as network interface cards, modems and so forth). The elements may be coupled to each other via system bus 1012, which represents one or more buses. In the case of multiple buses, they may be bridged by one or more bus bridges (not shown).

Each of these elements may perform its conventional functions known in the art. In particular, system memory 1004 and mass storage 1006 may be employed to store a working copy and a permanent copy of the programming instructions implementing the method of any of FIGS. 5-7, or portions thereof, when executed by the respective processing cores 1002, herein collectively denoted as computational logic 1022. The various components may be implemented by assembler instructions supported by processing cores 1002 or high-level languages, such as, for example, C, that can be compiled into such instructions. Processing cores 1002 and system memory 1004 may represents a broad range of processing core and memory arrangements including arrangements processing cores of various execution speeds and power consumptions, and memory of various architectures (e.g., with one or more levels of caches) and various types (e.g., dynamic random access, FLASH, etc.).

The permanent copy of the programming instructions may be placed into permanent storage 1006 in the factory, or in the field, through, for example, a machine-accessible distribution medium (not shown), such as a compact disc (CD), or through communication interface 1010 (e.g., from a distribution server (not shown)). That is, one or more distribution media having an implementation of the agent program may be employed to distribute the agent and program various computing devices. The constitution of elements 1002-1012 are known, and accordingly will not be further described.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 is a method for processing a binary translation (BT) task on a multi-core computing device, including: identifying, using a first processing core of the computing device, a BT task to be processed, the BT task associated with a set of code, during execution of the set of code on the first processing core; queuing, using the first processing core, the BT task in a queue accessible to a second processing core of the computing device, the second processing core being different from the first processing core; determining that the second processing core is in an idle state or has received an instruction through an operating system to enter an idle state; and in response to a determination that the second processing core is in an idle state or has received an instruction through an operating system to enter an idle state, processing at least some of the BT task using the second processing core.

Example 2 may include the subject matter of Example 1, and further includes: prior to processing at least some of the BT task using the second processing core, in response to a determination that the second processing core is in an idle state or has received an instruction to enter an idle state, changing a state of the second processing core to a non-idle state.

Example 3 may include the subject matter of Example 2, and further specifies that changing a state of the second processing core to a non-idle state further includes changing a context of the second processing core.

Example 4 may include the subject matter of any of Examples 1-3, and further includes: prior to processing at least some of the BT task using the second processing core, identifying a power management objective of the computing device, identifying a current state of the second processing core, determining whether changing a state of the second processing core from the current state to a non-idle state is consistent with the power management objective, and when changing a state of the second processing core to a non-idle state is consistent with the power management objective, changing the current state of the second processing core to the non-idle state.

Example 5 may include the subject matter of Example 4, and further specifies that identifying a power management objective of the computing device includes querying a power management logic for data representative of a target performance level of the computing device or data representative of a power supply of the computing device.

Example 6 may include the subject matter of any of Examples 4-5, and further specifies that the current state includes a halt state, a stop clock state, a sleep state, a voltage-scaled state or a frequency-scaled state.

Example 7 may include the subject matter of any of Examples 4-6, and further specifies that determining whether changing a state of the second processing core from the current state to a non-idle state is based on the power management objective, the BT task and the state of the second processing core.

Example 8 may include the subject matter of any of Examples 1-7, and further specifies that processing at least some of the BT task using the second processing core includes: identifying a power management objective of the computing device; determining whether processing the BT task using the second processing core is consistent with the power management objective: when processing the BT task using the second processing core is not consistent with the power management objective, portioning the BT task into a plurality of BT subtasks, wherein a first BT subtask of the plurality of BT subtasks may be processed using the second processing core consistently with the power management objective; and processing the first BT subtask using the second processing core.

Example 9 may include the subject matter of any of Examples 1-8, and further includes: while processing at least some of the BT task using the second processing core, receiving a signal representative of a request by an operating system to use the second processing core; and in response to the signal, stopping processing the at least some of the BT task using the second processing core.

Example 10 may include the subject matter of any of Examples 1-9, and further specifies that the BT task comprises translation of a portion of the set of code into another set of code or evaluating a performance characteristic of the set of code.

Example 11 may include the subject matter of any of Examples 1-10, and further specifies that processing at least some of the BT task using the second processing core occurs in parallel with execution of the set of code on the first processing core of the computing device.

Example 12 may include the subject matter of any of Examples 1-11, and further specifies that determining that the second processing core is in an idle state or has received an instruction through an operating system to enter an idle state includes determining that the second processing core has received an instruction through an operating system to enter an idle state, the instruction being transmitted from power management logic of the computing device.

Example 13 is one or more machine readable media including instructions that, in response to execution by a computing device, cause the computing device to perform the method of any of Examples 1-12.

Example 14 is an apparatus including a plurality of processing cores and one or more machine readable media including instructions that, in response to execution by the plurality of processing cores, cause the apparatus to perform the method of any of Examples 1-12.

Example 15 is an apparatus including logic for performing the operations of the method of any of Examples 1-12.

Example 16 is an apparatus including one or more means for performing the operations of the method of any of Examples 1-12.

What is claimed is:

1. At least one non-transitory machine readable medium comprising instructions that, in response to execution by a computing device, cause the computing device to:

identify a binary translation (BT) task to be processed, the BT task associated with a set of code, during execution of the set of code on a first processing core of the computing device;

queue the BT task in a queue accessible to a second processing core of the computing device, the second processing core being different from the first processing core;

determine that the second processing core is in an idle state or has received an instruction through an operating system to enter an idle state; and in response to a determination that the second processing core is in an idle state or has received an instruction through an operating system to enter an idle state, process at least some of the BT task using the second processing core, wherein:

prior to process at least some of the BT task using the second processing core,
  identify a power management objective of the computing device,
  identify a current state of the second processing core,
  determine whether changing a state of the second processing core from the current state to a non-idle state is consistent with the power management objective, and
  when changing the current state of the second processing core to the target non-idle state is consistent with the power management objective, change the current state of the second processing core to the non-idle state.

2. The at least one machine readable medium of claim 1, further comprising instructions that, in response to execution by the computing device, cause the computing device to: prior to process at least some of the BT task using the second processing core, in response to a determination that the second processing core is in an idle state or has received an instruction to enter an idle state, change a state of the second processing core to a non-idle state.

3. The at least one machine readable medium of claim 2, wherein change a state of the second processing core to a target non-idle state further comprises: change a context of the second processing core.

4. The at least one machine readable medium of claim 1, wherein identify a power management objective of the computing device comprises:

query a power management logic for data representative of a target performance level of the computing device or data representative of a power supply of the computing device.

5. The at least one machine readable medium of claim 1, wherein the current state comprises a halt state, a stop clock state, a sleep state, a voltage-scaled state or a frequency-scaled state.

6. The at least one machine readable medium of claim 1, wherein determine whether changing a state of the second processing core from the current state to a non-idle state is consistent with the power management objective is based on power management objective, the BT task and the current state of the second processing core.

7. The at least one machine readable medium of claim 1, further comprising instructions that, in response to execution by the computing device, cause the computing device to:

identify a power management objective of the computing device;

determine whether processing the BT task using the second processing core is consistent with the power management objective;

when processing the BT task using the second processing core is not consistent with the power management objective, portion the BT task into a plurality of BT subtasks, wherein a first BT subtask of the plurality of BT subtasks may be processed using the second processing core consistently with the power management objective; and process the first BT subtask using the second processing core.

8. The at least one machine readable medium of claim 1, further comprising: while processing at least some of the BT task using the second processing core, receive a signal representative of a request by an operating system to use the second processing core; and in response to the signal, stop processing the at least some of the BT task using the second processing core.

9. The at least one machine readable medium of claim 1, wherein the BT task comprises translation of a portion of the set of code into another set of code or evaluating a performance characteristic of the set of code.

10. The at least one machine readable medium of claim 1, wherein process at least some of the BT task using the second processing core occurs in parallel with execution of the set of code on the first processing core of the computing device.

11. The at least one machine readable medium of claim 1, wherein determine that the second processing core is in an idle state or has received an instruction through an operating system to enter an idle state comprises determine that the second processing core has received an instruction through an operating system to enter an idle state, the instruction being transmitted from power management logic of the computing device.

12. A method for processing a binary translation (BT) task on a multi-core computing device, comprising:
    identifying, using a first processing core of the computing device, a BT task to be processed, the BT task associated with a set of code, during execution of the set of code on the first processing core;
    queuing, using the first processing core, the BT task in a queue accessible to a second processing core of the computing device, the second processing core being different from the first processing core;
    determining that the second processing core is in an idle state or has received an instruction through an operating system to enter an idle state; and
    in response to a determination that the second processing core is in an idle state or has received an instruction through an operating system to enter an idle state, processing at least some of the BT task using the second processing core,
    wherein:
    prior to processing at least some of the BT task using the second processing core,
        identifying a power management objective of the computing device,
        identifying a current state of the second processing core,
        determining whether changing a state of the second processing core from the current state to a non-idle state is consistent with the power management objective, and
        when changing a state of the second processing core to a non-idle state is consistent with the power management objective, changing the current state of the second processing core to the non-idle state.

13. The method of claim 12, further comprising:
    prior to processing at least some of the BT task using the second processing core,
    in response to a determination that the second processing core is in an idle state or has received an instruction to enter an idle state, changing a state of the second processing core to a non-idle state.

14. The method of claim 13, wherein changing a state of the second processing core to a non-idle state further comprises:
    changing a context of the second processing core.

15. The method of claim 12, wherein identifying a power management objective of the computing device comprises:
    querying a power management logic for data representative of a target performance level of the computing device or data representative of a power supply of the computing device.

16. The method of claim 12, wherein the current state comprises a halt state, a stop clock state, a sleep state, a voltage-scaled state or a frequency-scaled state.

17. The method of claim 12, wherein determining whether changing a state of the second processing core from the current state to a non-idle state is based on the power management objective, the BT task and the state of the second processing core.

18. The method of claim 12, wherein processing at least some of the BT task using the second processing core comprises:
    identifying a power management objective of the computing device;
    determining whether processing the BT task using the second processing core is consistent with the power management objective;
    when processing the BT task using the second processing core is not consistent with the power management objective, portioning the BT task into a plurality of BT subtasks, wherein a first BT subtask of the plurality of BT subtasks may be processed using the second processing core consistently with the power management objective; and
    processing the first BT subtask using the second processing core.

19. The method of claim 12, further comprising:
    while processing at least some of the BT task using the second processing core, receiving a signal representative of a request by an operating system to use the second processing core; and
    in response to the signal, stopping processing the at least some of the BT task using the second processing core.

20. The method of claim 12, wherein the BT task comprises translation of a portion of the set of code into another set of code or evaluating a performance characteristic of the set of code.

21. The method of claim 12, wherein processing at least some of the BT task using the second processing core occurs in parallel with execution of the set of code on the first processing core of the computing device.

22. The method of claim 12, wherein determining that the second processing core is in an idle state or has received an instruction through an operating system to enter an idle state comprises determining that the second processing core has received an instruction through an operating system to enter an idle state, the instruction being transmitted from power management logic of the computing device.

23. An apparatus for processing a binary translation (BT) task, comprising:
    a plurality of processing cores; and
    one or more non-transitory machine readable media coupled with the plurality of processing cores, and configured with instructions that, in response to execution by the processing cores, cause the apparatus to perform the method of claim 12.

* * * * *